United States Patent Office 3,140,368
Patented July 7, 1964

3,140,368
WARNING AND/OR CONTROL DEVICE FOR USE WITH AIRCRAFT FUEL SUPPLY SYSTEMS
John Michael Crispin Young, Solihull, and Geoffrey Arthur Lewis, Acocks Green, Birmingham, England, assignors to Joseph Lucas (Industries) Limited, Birmingham, England
Filed Nov. 28, 1960, Ser. No. 72,198
Claims priority, application Great Britain Dec. 1, 1959
6 Claims. (Cl. 200—81.9)

The object of this invention is to provide a convenient device whereby the pilot of an aircraft can be warned, and/or an appropriate control can be effected, if the pressure of the fuel at the upstream side of the fuel pump of the engine falls to a value approaching that at which the fuel will cavitate.

A device according to the invention comprises a member movable between a non-operative position and an operative position in which it initiates the warning, and/or effects the control, and means responsive both to the pressure of fuel at the upstream side of the fuel pump, and to the vapour pressure of the fuel for controlling movement of said member.

Figure 1:
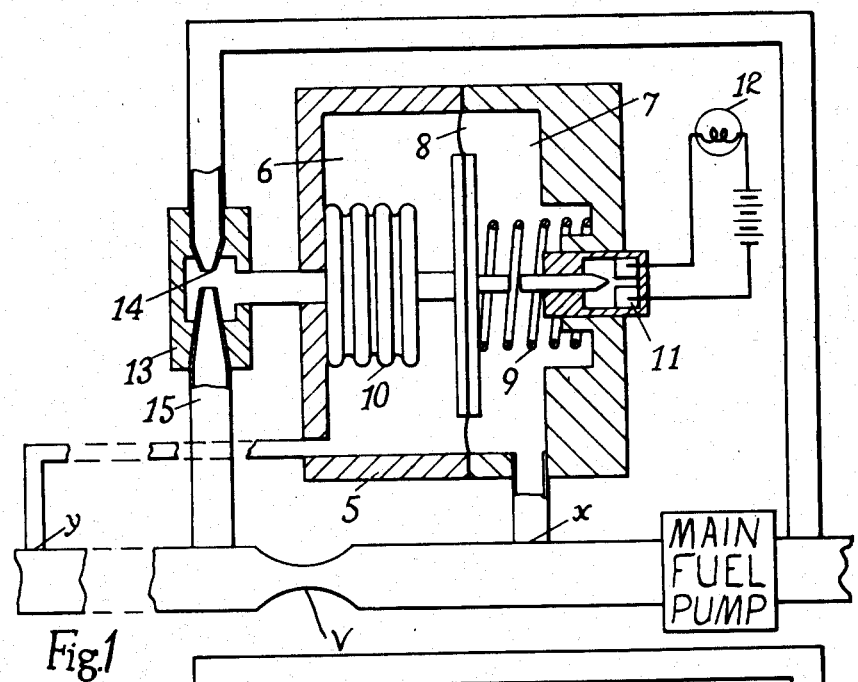
Figure 2:
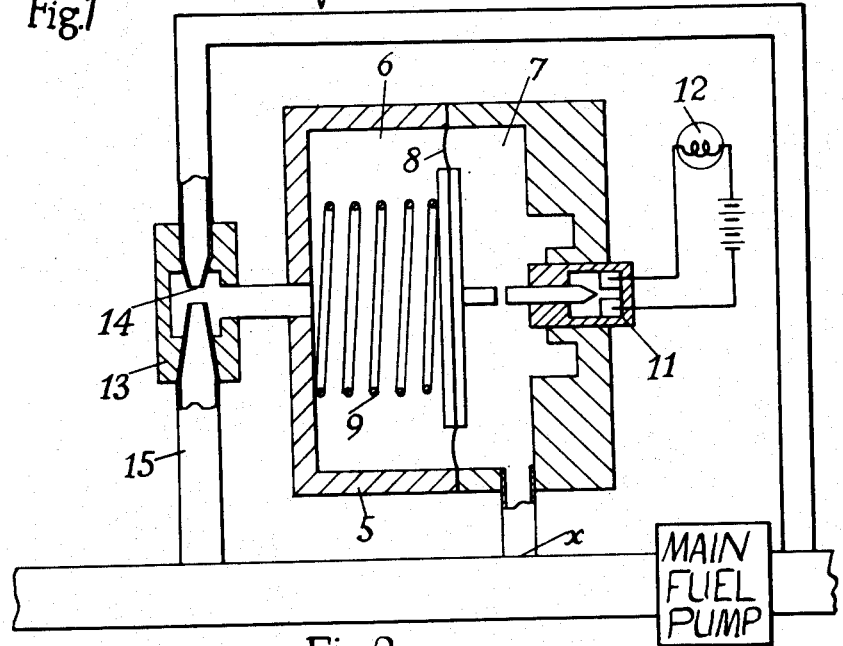
Figure 3:
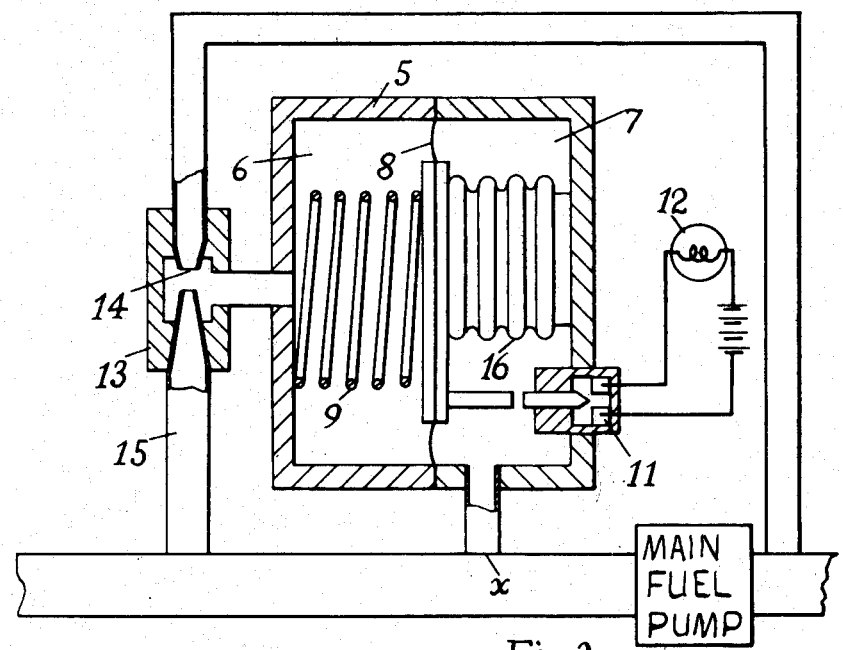
Figure 4:
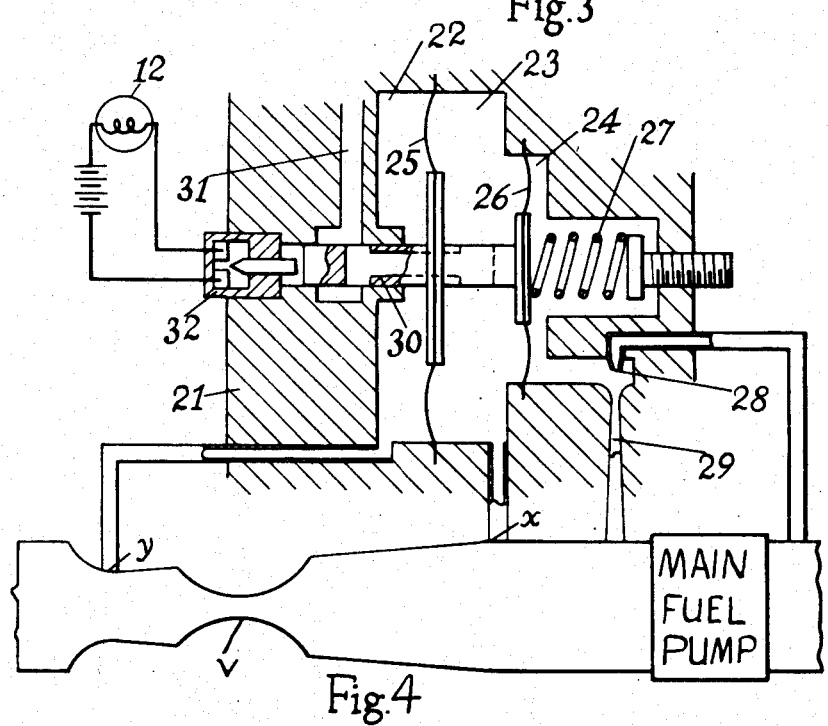
Figure 5:
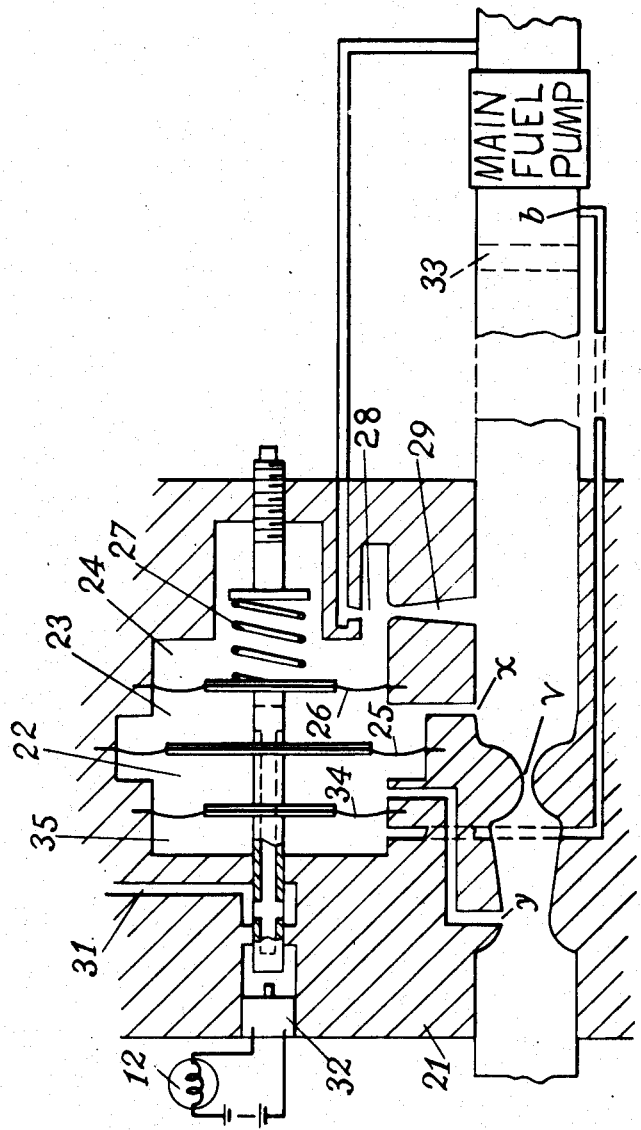

In the accompanying drawings FIGURE 1 is a sectional side view illustrating one example of the invention, FIGURES 2 and 3 respectively are views illustrating modifications of the example seen in FIGURE 1, and FIGURE 4 illustrates a further example, and FIGURE 5 shows a modification of the example seen in FIGURE 4.

Referring first to FIGURE 1 of the drawings there is provided a hollow body part 5 the interior of which is divided into two chambers 6, 7 by means of a flexible diaphragm 8. The chamber 7 is connected to a point $x$ in the fuel supply system adjacent the inlet of the main fuel pump of the engine to which fuel is supplied by a boost pump situated with the fuel tank of the aircraft. Also the chamber 7 contains a coiled compression spring 9 acting on the diaphragm 8 in a direction to increase the volume of the chamber 7.

The chamber 6 contains a flexible bellows 10 which defines a compartment within the chamber 6. The chamber 6 is connected to a point $y$ in the fuel supply system at the upstream side of point $x$. Moreover, the portion of the system between points $y$ and $x$ is a length of uniform or other piping wherein the fuel flow will be proportional to the square root of the pressure drop between points $y$ and $x$. This condition may conveniently be obtained by providing a venturi V in the length of pipe.

The bellows 10 is connected to the diaphragm 8, and the latter when moved against the action of the spring 9 is arranged to close a switch 11 controlling the circuit of a warning lamp 12. Furthermore, the interior of the bellows is connected to a hollow casing 13 containing a venturi nozzle 14 whereby the bellows 10 will be subjected to suction when the device is in use. Fuel may be supplied to the nozzle 14 from the downstream side of the fuel pump and an outlet 15 from the casing may be connected to a point intermediate the points $y$, $x$.

It has been found that the required boost pressure of a pump approximates to this law.

$$P = aF^2 + bP_v + C$$

where

F is the fuel flow
$P_v$ is the vapour pressure of the fuel, and
$a$, $b$, and $c$ are constants.

Provided the driving pressure of the pump is high enough the fuel within the casing will vapourise and the interior of the bellows 10 will therefore be subjected to the vapour pressure of the fuel in the system at any time.

The forces acting to close the switch against the action of the spring are therefore $$P_v B + Py(A - B) - PxA$$

where

B is the area of the bellows,
A is the area of the diaphragm, and
P$x$ and P$y$ are the pressures at points $x$, $y$ respectively.

If S is the spring force, then in equilibrium:

$$PvB + Py(A - B) - P \times A = S$$

This can be re-written as:

$$PvB + Py(A - B) - Px(A - B) - BPx = S$$

Whence:

$$PvB + (Py - Px)(A - B) - S = BPx$$

Since $(Py - Px)$ is proportional to $F^2$ and S is substantially constant within the range of movement concerned, this expression is of the form:

$$Px = a^1 F^2 + b^1 Pv + c^1$$

with $a^1$, $b^1$ and $c^1$ constant. By suitably choosing the values of the various constants this expression can be made to approximate closely to the theoretical expression for the required boost pressure of a pump. Thus, when the pressure drop between points $y$ and $x$ reaches a value approaching that at which cavitation of the fuel will occur the switch 11 will close to give a warning to the pilot irrespective of the type of fuel being used or its temperature.

Whilst it is preferable for the force acting to close the switch to be of the form discussed above, the invention is also useful where the force is dependent on the vapour pressure but not on the flow. Thus, in the alternative construction shown in FIGURE 2 both the bellows 10 and the connection to the point $y$ are omitted so that the chamber 6 is subjected solely to vapour pressure. Moreover, in this example the spring 9 is situated in the chamber 6 and acts in a direction to decrease the size of the chamber 7. With this arrangement the spring 9 balances the difference between boost pressure and vapour pressure.

In the modification of the alternative construction shown in FIGURE 3 the chamber 7 connected to the point $x$ further incorporates an evacuated bellows 16. This ensures that the difference between boost pressure and vapour pressure increases with increase of boost pressure.

Referring now to the example of the invention illustrated in FIGURE 4, there is provided a hollow body part 21 which is divided into three chambers 22, 23, 24 by a pair of diaphragms 25, 26. The chambers 22, 23 are connected to points $y$, $x$ in the fuel supply system as described with reference to the first example, whilst within the chamber 24 is an adjustable spring 27 which acts in a direction to increase the size of the chamber 24. Furthermore, within the chamber 24 is a venturi nozzle 28 through which fuel is supplied from the downstream side of the fuel pump and then returned to the upstream side of the pump through a passage 29 in the body part. The passage of fuel through the nozzle 28 ensures that the diaphragm 26 is subjected to suction in use.

The diaphragms 25, 26 are interconnected by a stem 30 which extends through the diaphragm 25 into a bore in the body part 21. Within the stem is a bore terminating at one end in radial ports communicating with the chamber 23, and at its other end in a second series of radial ports through which communication can be established with a passage 31 in the body part and in communication with a servo mechanism for controlling the boost pump pressure. The amount by which the passage 31 is uncovered to allow fuel to flow from the passage 31 to the chamber 23 is dependent on the position of the stem 30, and the latter also serves to actuate a switch 32 for controlling the circuit of a warning lamp 33.

In this example the chamber 24 will be subjected to the fuel vapour pressure $P_v$, and hence the forces acting to close the switch 32 are $$(Px-Py)A-(Px-Pv)B+S$$

where $Px$, $Py$ are the pressures at the points $x$, $y$ respectively A, B are the areas of the diaphragms 25, 26 respectively, and S is the spring force.

Since $(Px-Py)$ is proportional to $F^2$, an equilibrium position is reached when:

$$A'F^2+PvB+S=PxB$$

where $A'$ is constant.

As in the first example, this expression can be made to match the theoretical expression for the required boost pressure of a pump. In this case when $Px$ reaches a value approaching that at which cavitation will occur the stem 30 will be moved to cause operation of the servo-mechanism and to give a warning to the pilot. This control will, as in the first example, be independent of the type of fuel used or its temperature.

The example illustrated in FIGURE 5 is a modification of that shown in FIGURE 4 and is designed for use where the fuel supply system includes a filter 33. In order to allow for the pressure drop across the filter a third diaphragm 34 is provided, this diaphragm defining a third chamber 35 which is connected to the fuel supply system at a point $b$ between the filter and the main fuel pump.

In this example, the forces acting to close the switch 32 are:

$$(Py-Pb)C+(Px-Py)A+(Pv-Px)B+S$$

where C is the area of the diaphragm 34. If, as shown, the areas C, B are equal, this expression can be rewritten:

$$(Px-Py)(A-B)+PvB+S$$

Hence, since $(Px-Py)$ is proportional to $F^2$, and equilibrium position is reached when:

$$A''F^2+PvB+S=PxB$$

where $A''$ is constant.

It will be noted that this expression is similar in form to that obtained with reference to FIGURE 4, so that in effect the additional diaphragm has compensated for the pressure drop across the filter 33.

It will be appreciated that in all the examples described the diaphragms could be replaced by pistons, and in the example shown in FIGURES 1 to 3 means could be incorporated in addition to or in place of the warning circuit for effecting a control of boost pressure. Furthermore in each of the examples the venturi nozzle could be replaced by a gear or other pump whereby suction can be applied to the appropriate chamber or bellows, the pump drawing fuel through a restriction.

Having thus described our invention what we claim as new and desire to secure by Letters Patent is:

1. In an aircraft fuel supply system including a main fuel pump having an inlet and an outlet, a hollow body, a pressure sensitive member within the body and serving in part to define a compartment within said body, passage means connecting said compartment to the inlet to the main fuel pump, a by-pass circuit interconnecting the inlet and outlet of the main fuel pump, a chamber forming part of said by-pass circuit, restriction means in said chamber for vaporising a portion of the fuel flowing through the by-pass circuit, so that the pressure in said chamber is the vapor pressure of the fuel, means for subjecting the pressure sensitive member to said vapor pressure so that the vapor pressure acts to urge said pressure sensitive member in a direction opposite to the direction in which it is urged by the pressure of fuel in the fuel system entering the main fuel pump, means for subjecting the pressure sensitive member to further forces to balance the forces acting on the pressure system under normal operating conditions, a switch, and a switch actuating member movable by said pressure sensitive member to actuate the switch when the pressure of fuel entering the main fuel pump falls below a predetermined value which varies with said vapor pressure.

2. In air aircraft fuel supply system including a main fuel pump having an inlet and an outlet, a hollow body, a pressure sensitive member within said body and dividing said body into first and second compartments, passage means connecting said first compartment to the inlet to the main fuel pump, a by-pass circuit interconnecting the inlet and outlet of the main fuel pump, a chamber forming part of said by-pass circuit, restriction means in said chamber for vaporising a portion of the fuel flowing through the by-pass circuit, so that the pressure in said chamber is the vapor pressure of the fuel, a bellows within said second compartment, means connecting the bellows to the pressure sensitive member, passage means connecting the interior of the bellows to said chamber so that the interior of said bellows is subjected to said vapor pressure, a spring acting on said pressure sensitive member in a direction to increase the size of the first compartment, a restriction in the fuel supply system at the inlet side of the main fuel pump, said restriction providing a pressure drop across the restriction proportional to the square of the flow of fuel through the restriction, passage means connecting the upstream side of said restriction to said second compartment, a switch, and a switch actuating member movable by said pressure sensitive member to actuate the switch when the pressure of fuel entering the main fuel pump falls below a predetermined value which varies with said vapor pressure and with the square of the flow of fuel to the main fuel pump.

3. In an aircraft fuel supply system including a main fuel pump having an inlet and an outlet, a hollow body, a pressure sensitive member within said body and dividing said body into first and second compartments, passage means connecting said first compartment to the inlet to the main fuel pump, a by-pass circuit interconnecting the inlet and outlet of the main fuel pump, a chamber forming part of said by-pass circuit, restriction means in said chamber for vaporising a portion of the fuel flowing through the by-pass circuit so that the pressure in said chamber is the vapor pressure of the fuel, passage means connecting said second compartment to said chamber so that said second compartment is subjected to said vapor pressure, a spring acting on the pressure sensitive member in a direction to increase the size of the second compartment, a switch, and a switch actuating member movable by said pressure sensitive member to actuate the switch when the pressure of fuel entering the main fuel pump falls below a predetermined value which varies with said vapor pressure.

4. In an aircraft fuel supply system including a main fuel pump having an inlet and an outlet, a hollow body, a pressure sensitive member within said body and dividing said body into first and second compartments, passage means connecting said first compartment to the inlet to the main fuel pump, a by-pass circuit interconnecting the inlet and outlet of the main fuel pump, a chamber forming part of said by-pass circuit, restriction means in said chamber for varporising a portion of the fuel flowing through the by-pass circuit, so that the pressure in said chamber is the vapor pressure of the fuel, passage means connecting said second compartment to said chamber so that said second compartment is subjected to said vapor pressure, a spring acting on the pressure sensitive member in a direction to increase the size of the second compartment, an evacuated bellows within the first compartment, means connecting said evacuated bellows to the pressure sensitive member, a switch, and a switch actuating member movable by said pressure sensitive member to actuate the switch when the pressure of fuel entering the main fuel pump falls below a predetermined value which varies with said vapor pressure.

5. In an aircraft fuel supply system including a main fuel pump having an inlet and an outlet, a hollow body, first and second pressure sensitive members of unequal area within said body, and defining therewith a first compartment between the pressure-sensitive members, a second compartment between the second pressure sensitive member and the body, and a third compartment between the first pressure sensitive member and the body, means interconnecting said first and second pressure sensitive members, passage means connecting said first compartment to the inlet to the main fuel pump, a by-pass circuit interconnecting the inlet and outlet of the main fuel pump, a chamber forming part of said by-pass circuit, restriction means in said chamber for vaporising a portion of the fuel flowing through the by-pass circuit, so that the pressure in said chamber is the vapor pressure of the fuel, passage means connecting said third compartment to said chamber so that said third compartment is subjected to said vapor pressure, a spring acting on said first pressure sensitive member in a direction to increase the size of said third compartment, a restriction in the fuel supply system at the inlet side of the main fuel pump, said restriction providing a pressure drop across the restriction proportional to the square of the flow of fuel through the restriction, passage means connecting the upstream side of said restriction to said second compartment, a switch, and a switch actuating member movable by said pressure sensitive members to actuate the switch when the pressure of fuel entering the main fuel pump falls below a predetermined value which varies with said vapor pressure and with the square of the flow of fuel to the main fuel pump.

6. In an aircraft fuel supply system including a main fuel pump having an inlet and an outlet and a filter at the inlet side of the pump, a hollow body, first, second and third pressure sensitive members within said body, the second pressure sensitive member having an area different from the areas of the first and third pressure sensitive members and the pressure sensitive members and body defining a first compartment between the first and second pressure sensitive members, a second compartment between the second and third pressure sensitive members, a third compartment between the first pressure sensitive member and the body, and a fourth compartment between the third pressure sensitive member and the body, a by-pass circuit interconnecting the inlet and outlet of the main fuel pump, a chamber forming part of said by-pass circuit, restriction means in said chamber for vaporising a portion of the fuel flowing through the by-pass circuit so that the pressure in said chamber is the vapor pressure of the fuel, passage means connecting said third compartment to said chamber so that said third compartment is subjected to said vapor pressure, a spring acting on said first pressure sensitive member in a direction to increase the size of said third compartment, a restriction in the fuel supply system at the upstream side of said filter, said restriction providing a pressure drop across the restriction proportional to the square of the flow of fuel through the restriction, second passage means connecting the second compartment to the fuel system upstream of said restriction, third passage means connecting the first compartment to the fuel system downstream of said restriction but upstream of said filter, fourth passage means connecting the fourth compartment to the fuel system downstream of said filter but upstream of the inlet to the main fuel pump, a switch, and a switch actuating member movable by said pressure sensitive members to actuate the switch when the pressure of fuel entering the main fuel pump falls below a predetermined value which varies with said vapor pressure and with the square of the flow of fuel to the main fuel pump.

References Cited in the file of this patent
UNITED STATES PATENTS

| | | |
|---|---|---|
| 2,772,409 | Reid | Nov. 27, 1956 |
| 2,773,251 | Snyder | Dec. 4, 1956 |
| 2,988,885 | Schnaible | June 20, 1961 |
| 3,033,277 | Cowles et al. | May 8, 1962 |

FOREIGN PATENTS

| | | |
|---|---|---|
| 880,953 | Germany | June 25, 1953 |
| 798,496 | Great Britain | July 29, 1955 |